(12) United States Patent
Khan

(10) Patent No.: US 7,894,818 B2
(45) Date of Patent: Feb. 22, 2011

(54) APPARATUS AND METHOD FOR MULTIPLEXING BROADCAST AND UNICAST TRAFFIC IN A MULTI-CARRIER WIRELESS NETWORK

(75) Inventor: Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1236 days.

(21) Appl. No.: 11/414,965

(22) Filed: May 1, 2006

(65) Prior Publication Data

US 2006/0285483 A1    Dec. 21, 2006

Related U.S. Application Data

(60) Provisional application No. 60/690,846, filed on Jun. 15, 2005, provisional application No. 60/690,743, filed on Jun. 15, 2005.

(51) Int. Cl.
    *H04J 11/00* (2006.01)
(52) U.S. Cl. ............. 455/450; 455/464; 455/509; 370/329
(58) Field of Classification Search ............ 455/450
    See application file for complete search history.

(56) References Cited

U.S. PATENT DOCUMENTS

| | | | | |
|---|---|---|---|---|
| 4,589,107 | A * | 5/1986 | Middleton et al. | 370/265 |
| 5,444,697 | A * | 8/1995 | Leung et al. | 370/207 |
| 5,481,546 | A * | 1/1996 | Dinkins | 370/329 |
| 5,748,677 | A * | 5/1998 | Kumar | 375/285 |
| 6,028,900 | A * | 2/2000 | Taura et al. | 375/344 |
| 6,035,003 | A * | 3/2000 | Park et al. | 375/326 |
| 6,125,124 | A * | 9/2000 | Junell et al. | 370/503 |
| 6,148,007 | A * | 11/2000 | Kroeger | 370/480 |
| 6,148,045 | A * | 11/2000 | Taura et al. | 375/344 |
| 6,178,036 | B1 * | 1/2001 | Yao | 359/334 |
| 6,359,923 | B1 * | 3/2002 | Agee et al. | 375/130 |
| 6,377,819 | B1 * | 4/2002 | Gesbert et al. | 455/562.1 |
| 6,421,401 | B1 * | 7/2002 | Palin | 375/343 |
| 6,480,522 | B1 * | 11/2002 | Hoole et al. | 375/130 |
| 6,522,700 | B1 * | 2/2003 | Zimmermann et al. | 375/295 |
| 6,621,851 | B1 * | 9/2003 | Agee et al. | 375/130 |
| 6,628,638 | B1 * | 9/2003 | Sato et al. | 370/343 |
| 6,631,143 | B1 * | 10/2003 | Karim | 370/514 |
| 6,633,258 | B2 * | 10/2003 | Lindenmeier et al. | 342/374 |
| 6,731,594 | B1 * | 5/2004 | Bohnke | 370/208 |
| 6,768,457 | B2 * | 7/2004 | Lindenmeier | 342/374 |
| 6,816,453 | B1 * | 11/2004 | Sakamoto | 370/210 |
| 6,885,674 | B2 * | 4/2005 | Hunt et al. | 370/420 |
| 6,907,026 | B2 * | 6/2005 | Akiyama | 370/344 |
| 6,947,748 | B2 * | 9/2005 | Li et al. | 455/450 |

(Continued)

FOREIGN PATENT DOCUMENTS

WO    WO 2007064252 A1 *    6/2007

*Primary Examiner*—Duc Nguyen
*Assistant Examiner*—Hai V Nguyen

(57) ABSTRACT

A base station for use in an orthogonal frequency division multiplexing (OFDM) wireless network capable of communicating with a plurality of subscriber stations in a coverage area of the OFDM wireless network. The base station is capable of transmitting a first OFDM symbol in a first time slot, wherein the first OFDM symbol comprises a first plurality of subcarriers used to transmit broadcast data directed to a plurality of subscriber stations and a second plurality of subcarriers used to transmit unicast data directed to at least one selected subscriber station.

24 Claims, 8 Drawing Sheets

U.S. PATENT DOCUMENTS

| | | | | |
|---|---|---|---|---|
| 6,952,394 B1* | 10/2005 | Kim et al. | | 370/208 |
| 7,002,934 B2* | 2/2006 | Dolgonos et al. | | 370/328 |
| 7,012,949 B2* | 3/2006 | Uesugi | | 375/130 |
| 7,031,371 B1* | 4/2006 | Lakkis | | 375/146 |
| 7,042,957 B1* | 5/2006 | Zirwas | | 375/295 |
| 7,047,006 B2* | 5/2006 | Classon et al. | | 455/434 |
| 7,106,781 B2* | 9/2006 | Agee et al. | | 375/141 |
| 7,110,434 B2* | 9/2006 | Currivan et al. | | 375/144 |
| 7,149,238 B2* | 12/2006 | Agee et al. | | 375/141 |
| 7,149,239 B2* | 12/2006 | Hudson | | 375/144 |
| 7,177,266 B2* | 2/2007 | Sudo | | 370/208 |
| 7,184,485 B2* | 2/2007 | Balakrishnan et al. | | 375/260 |
| 7,187,646 B2* | 3/2007 | Schramm | | 370/206 |
| 7,215,700 B2* | 5/2007 | Currivan et al. | | 375/148 |
| 7,221,680 B2* | 5/2007 | Vijayan et al. | | 370/441 |
| 7,242,722 B2* | 7/2007 | Krauss et al. | | 375/260 |
| 7,257,410 B2* | 8/2007 | Chun et al. | | 455/455 |
| 7,266,108 B2* | 9/2007 | Sato et al. | | 370/343 |
| 7,272,359 B2* | 9/2007 | Li et al. | | 455/67.13 |
| 7,286,466 B2* | 10/2007 | Chen et al. | | 370/210 |
| 7,292,647 B1* | 11/2007 | Giannakis et al. | | 375/295 |
| 7,292,650 B2* | 11/2007 | Lee et al. | | 375/316 |
| 7,324,437 B1* | 1/2008 | Czylwik et al. | | 370/210 |
| 7,336,156 B2* | 2/2008 | Arita et al. | | 340/310.11 |
| 7,400,609 B2* | 7/2008 | Hammerschmidt | | 370/338 |
| 7,406,128 B2* | 7/2008 | Sakamoto | | 375/260 |
| 7,406,261 B2* | 7/2008 | Shattil | | 398/76 |
| 7,415,061 B2* | 8/2008 | Currivan et al. | | 375/144 |
| 7,423,997 B2* | 9/2008 | Kuchibhotla et al. | | 370/336 |
| 7,430,193 B2* | 9/2008 | Kim et al. | | 370/338 |
| 7,430,257 B1* | 9/2008 | Shattil | | 375/347 |
| 7,433,413 B2* | 10/2008 | Cheun et al. | | 375/260 |
| 7,450,653 B2* | 11/2008 | Abe | | 375/260 |
| 7,457,351 B1* | 11/2008 | Currivan et al. | | 375/148 |
| 7,457,352 B2* | 11/2008 | Currivan et al. | | 375/148 |
| 7,464,166 B2* | 12/2008 | Larsson et al. | | 709/228 |
| 7,500,261 B1* | 3/2009 | Myers | | 725/105 |
| 7,512,409 B1* | 3/2009 | Hadad | | 455/502 |
| 7,522,513 B2* | 4/2009 | Henriksson | | 370/208 |
| 7,532,565 B2* | 5/2009 | Batra et al. | | 370/208 |
| 7,535,967 B2* | 5/2009 | Krauss et al. | | 375/260 |
| 7,542,517 B2* | 6/2009 | Kroeger | | 375/296 |
| 7,558,191 B2* | 7/2009 | Monogioudis et al. | | 370/208 |
| 7,577,214 B2* | 8/2009 | Abe | | 375/326 |
| 7,593,449 B2* | 9/2009 | Shattil | | 375/130 |
| 7,616,610 B2* | 11/2009 | Kuchibhotla et al. | | 370/335 |
| 7,636,366 B2* | 12/2009 | Terabe | | 370/401 |
| 7,650,126 B2* | 1/2010 | Birru et al. | | 455/226.1 |
| 7,653,860 B2* | 1/2010 | Younkin et al. | | 714/755 |
| 7,664,186 B2* | 2/2010 | Brotje et al. | | 375/260 |
| 7,697,409 B2* | 4/2010 | Larsson | | 370/204 |
| 7,724,838 B2* | 5/2010 | Mantravadi | | 375/295 |
| 7,773,697 B2* | 8/2010 | Dibiaso et al. | | 375/329 |
| 2002/0058487 A1* | 5/2002 | Takeuchi | | 455/260 |
| 2002/0088005 A1* | 7/2002 | Wu et al. | | 725/129 |
| 2002/0154059 A1* | 10/2002 | Lindenmeier et al. | | 342/374 |
| 2002/0196183 A1* | 12/2002 | Lindenmeier | | 342/374 |
| 2003/0012126 A1* | 1/2003 | Sudo | | 370/203 |
| 2003/0016731 A1* | 1/2003 | Uesugi | | 375/130 |
| 2003/0043887 A1* | 3/2003 | Hudson | | 375/144 |
| 2003/0112890 A1* | 6/2003 | Kroeger et al. | | 375/296 |
| 2003/0147655 A1* | 8/2003 | Shattil | | 398/182 |
| 2003/0185174 A1* | 10/2003 | Currivan et al. | | 370/335 |
| 2003/0224784 A1* | 12/2003 | Hunt et al. | | 455/426.2 |
| 2004/0052315 A1* | 3/2004 | Thielecke et al. | | 375/299 |
| 2004/0127166 A1* | 7/2004 | Oshima | | 455/74 |
| 2004/0151145 A1* | 8/2004 | Hammerschmidt | | 370/338 |
| 2004/0151146 A1* | 8/2004 | Hammerschmidt | | 370/338 |
| 2004/0227036 A1* | 11/2004 | Arita et al. | | 246/209 |
| 2005/0002463 A1* | 1/2005 | Sakamoto | | 375/260 |
| 2005/0058089 A1* | 3/2005 | Vijayan et al. | | 370/312 |
| 2005/0058104 A1* | 3/2005 | Yomo et al. | | 370/335 |
| 2005/0068918 A1* | 3/2005 | Mantravadi et al. | | 370/328 |
| 2005/0084000 A1* | 4/2005 | Krauss et al. | | 375/148 |
| 2005/0085214 A1* | 4/2005 | Laroia et al. | | 455/403 |
| 2005/0135291 A1* | 6/2005 | Ketchum et al. | | 370/319 |
| 2005/0135403 A1* | 6/2005 | Ketchum et al. | | 370/437 |
| 2005/0135416 A1* | 6/2005 | Ketchum et al. | | 370/469 |
| 2005/0141460 A9* | 6/2005 | Currivan et al. | | 370/335 |
| 2005/0141475 A1* | 6/2005 | Vijayan et al. | | 370/345 |
| 2005/0152480 A1* | 7/2005 | Chang et al. | | 375/343 |
| 2005/0163196 A1* | 7/2005 | Currivan et al. | | 375/144 |
| 2005/0169411 A1* | 8/2005 | Kroeger | | 375/350 |
| 2005/0175070 A1* | 8/2005 | Grob et al. | | 375/141 |
| 2005/0180517 A1* | 8/2005 | Abe | | 375/260 |
| 2005/0181814 A1* | 8/2005 | Okamoto et al. | | 455/517 |
| 2005/0232183 A1* | 10/2005 | Sartori et al. | | 370/319 |
| 2005/0245258 A1* | 11/2005 | Classon et al. | | 455/434 |
| 2005/0265280 A1* | 12/2005 | Roh et al. | | 370/328 |
| 2005/0271027 A1* | 12/2005 | Kim et al. | | 370/343 |
| 2006/0007887 A1* | 1/2006 | Kwon et al. | | 370/329 |
| 2006/0008017 A1* | 1/2006 | Balakrishnan et al. | | 375/260 |
| 2006/0013325 A1* | 1/2006 | Agrawal et al. | | 375/260 |
| 2006/0018269 A1* | 1/2006 | Agrawal et al. | | 370/321 |
| 2006/0018279 A1* | 1/2006 | Agrawal et al. | | 370/330 |
| 2006/0030330 A1* | 2/2006 | Black | | 455/446 |
| 2006/0045001 A1* | 3/2006 | Jalali | | 370/208 |
| 2006/0067206 A1* | 3/2006 | Mantravadi et al. | | 370/208 |
| 2006/0104376 A1* | 5/2006 | Abe | | 375/260 |
| 2006/0114812 A1* | 6/2006 | Kim et al. | | 370/206 |
| 2006/0203713 A1* | 9/2006 | Laroia et al. | | 370/209 |
| 2006/0227891 A1* | 10/2006 | Niu et al. | | 375/267 |
| 2006/0245347 A1* | 11/2006 | Jayaraman et al. | | 370/208 |
| 2006/0269005 A1* | 11/2006 | Laroia et al. | | 375/260 |
| 2006/0274854 A1* | 12/2006 | Matsumoto et al. | | 375/304 |
| 2006/0285483 A1* | 12/2006 | Khan | | 370/208 |
| 2007/0002724 A1* | 1/2007 | Khan | | 370/203 |
| 2007/0009012 A1* | 1/2007 | Carrivan et al. | | 375/144 |
| 2007/0011550 A1* | 1/2007 | Agrawal et al. | | 714/746 |
| 2007/0014334 A1* | 1/2007 | Currivan et al. | | 375/148 |
| 2007/0036066 A1* | 2/2007 | Thomas et al. | | 370/208 |
| 2007/0058595 A1* | 3/2007 | Classon et al. | | 370/337 |
| 2007/0064669 A1* | 3/2007 | Classon et al. | | 370/347 |
| 2007/0071121 A1* | 3/2007 | van Rooyen | | 375/260 |
| 2007/0165514 A1* | 7/2007 | Akita | | 370/208 |
| 2007/0189149 A1* | 8/2007 | Terabe | | 370/208 |
| 2007/0189289 A1* | 8/2007 | Frederiksen et al. | | 370/390 |
| 2007/0211786 A1* | 9/2007 | Shattil | | 375/141 |
| 2007/0242600 A1* | 10/2007 | Li et al. | | 370/210 |
| 2007/0253321 A1* | 11/2007 | Akita et al. | | 370/208 |
| 2007/0253496 A1* | 11/2007 | Giannakis et al. | | 375/260 |
| 2007/0258357 A1* | 11/2007 | Akita | | 370/208 |
| 2007/0258358 A1* | 11/2007 | Cho et al. | | 370/208 |
| 2008/0032744 A1* | 2/2008 | Khan et al. | | 455/562.1 |
| 2008/0039107 A1* | 2/2008 | Ma et al. | | 455/450 |
| 2008/0043709 A1* | 2/2008 | Zhou et al. | | 370/348 |
| 2008/0062857 A1* | 3/2008 | Monogioudis et al. | | 370/208 |
| 2008/0084845 A1* | 4/2008 | Kuchibhotla et al. | | 370/331 |
| 2008/0095223 A1* | 4/2008 | Tong et al. | | 375/228 |
| 2008/0165671 A1* | 7/2008 | Larsson | | 370/204 |
| 2008/0212510 A1* | 9/2008 | Larsson | | 370/312 |
| 2008/0291980 A1* | 11/2008 | Currivan et al. | | 375/148 |
| 2008/0298437 A1* | 12/2008 | Currivan et al. | | 375/144 |
| 2008/0304551 A1* | 12/2008 | Li et al. | | 375/140 |
| 2008/0304584 A1* | 12/2008 | Nishio et al. | | 375/260 |
| 2008/0310409 A1* | 12/2008 | Larsson et al. | | 370/389 |
| 2009/0010352 A1* | 1/2009 | Bottomley et al. | | 375/260 |
| 2009/0028258 A1* | 1/2009 | Ma et al. | | 375/260 |
| 2009/0034638 A1* | 2/2009 | Sawahashi et al. | | 375/260 |
| 2009/0061887 A1* | 3/2009 | Hart et al. | | 455/450 |
| 2009/0110033 A1* | 4/2009 | Shattil | | 375/141 |
| 2009/0116421 A1* | 5/2009 | Kawasaki | | 370/312 |
| 2009/0141818 A1* | 6/2009 | Hiramatsu et al. | | 375/260 |
| 2009/0147738 A1* | 6/2009 | Larsson et al. | | 370/329 |

| | | | | | | | |
|---|---|---|---|---|---|---|---|
| 2009/0175162 | A1* | 7/2009 | Monogioudis et al. ...... 370/210 | 2010/0120442 | A1* | 5/2010 | Zhuang et al. .............. 455/450 |
| 2009/0175370 | A1* | 7/2009 | Kuroda et al. ............... 375/260 | 2010/0214992 | A1* | 8/2010 | Hart et al. ................... 370/329 |
| 2009/0268662 | A1* | 10/2009 | Larsson et al. .............. 370/328 | 2010/0220708 | A1* | 9/2010 | Mantravadi et al. ......... 370/343 |
| 2009/0296833 | A1* | 12/2009 | Sawahashi .................. 375/260 | * cited by examiner | | | |

APPARATUS AND METHOD FOR MULTIPLEXING BROADCAST AND UNICAST TRAFFIC IN A MULTI-CARRIER WIRELESS NETWORK

CROSS-REFERENCE TO RELATED APPLICATIONS AND CLAIMS OF PRIORITY

The present application is related to U.S. Provisional Patent No. 60/690,846, filed Jun. 15, 2005, entitled "Multiplexing of Broadcast and Unicast Traffic" and U.S. Provisional Patent No. 60/690,743, filed Jun. 15, 2005, entitled "Broadcast Superposition and Interference Cancellation". U.S. Provisional Patent Nos. 60/690,846 and 60/690,743 are assigned to the assignee of this application and are incorporated by reference as if fully set forth herein. The present application hereby claims priority under 35 U.S.C. §119(e) to U.S. Provisional Patent Nos. 60/690,846 and 60/690,743.

The present application is related to U.S. Patent Application Serial No. [2005.06.002.WS0], entitled "Apparatus and Method for Broadcast Superposition and Cancellation in a Multi-Carrier Wireless Network," filed concurrently herewith. Application Serial No. [2005.06.002.WS0] is assigned to the assignee of this application. The subject matter disclosed in Application Serial No. [2005.06.002.WS0] is incorporated by reference as if fully set forth herein.

TECHNICAL FIELD OF THE INVENTION

The present application relates generally to wireless communications and, more specifically, to apparatuses and methods for multiplexing broadcast and unicast data traffic in a multicarrier wireless network.

BACKGROUND OF THE INVENTION

Orthogonal frequency division multiplexing (OFDM) is a multi-carrier transmission technique in which a user transmits on many orthogonal frequencies (or subcarriers). The orthogonal subcarriers are individually modulated and separated in frequency such that they do not interfere with one another. This provides high spectral efficiency and resistance to multipath effects. An orthogonal frequency division multiple access (OFDMA) system allows some subcarriers to be assigned to different users, rather than to a single user. Today, OFDM and OFDMA technology are used in both wireline transmission systems, such as asymmetric digital subscriber line (ADSL), and wireless transmission systems, such as IEEE-802.11a/g (i.e., WiFi), IEEE-802.16 (e.g., WiMAX), digital audio broadcast (DAB), and digital video broadcast (DVB). This technology is also used for wireless digital audio and video broadcasting.

OFDM networks support the transmission of both broadcast traffic, intended for multiple subscriber stations (i.e., user devices), and unicast traffic, intended for a single subscriber station. Conventional OFDM networks time-multiplex broadcast and unicast traffic in the downlink (i.e., forward channels) by transmitting broadcast and unicast traffic in different downlink transmission time intervals. Accordingly, broadcast traffic may be transmitted in a first transmission time interval (TTI), while unicast traffic is transmitted in at least one TTI other than the first TTI. In general, the duration of each TTI is fixed. The number of OFDM symbols within a TTI may be different for broadcast traffic and unicast traffic. In general, a smaller number of OFDM symbols are carried in a broadcast TTI in order to allow for a longer cyclic prefix (CP).

By way of example, an OFDM network may transmit a 5 millisecond frame in the downlink. Each downlink frame contains eight transmission time intervals, where each TTI is 0.625 milliseconds in duration. Every fourth TTI is reserved for broadcast traffic. Each unicast TTI contains K OFDM symbols and each broadcast TTI contains less than K OFDM symbols.

The signal-to-interference and noise ratio (SINR) for unicast traffic may be written as:

$$SINR_{unicast} = \frac{P}{fP + N_0}, \quad [\text{Eqn. 1}]$$

where the value P represents the received power at the subscriber station from the same cell and the value f represents the ratio between other cell and same cell signals. In an interference limited situation, which is the case for most cellular deployments, $fP \gg N_0$. Therefore, SINR may be written as:

$$SINR_{unicast} = \frac{P}{fP + N_0} = \frac{P}{fP} = \frac{1}{f}. \quad [\text{Eqn. 2}]$$

It should be noted that increasing the power, P, does not help to improve unicast SINR.

In the case of broadcast traffic using OFDM, the signals received by a subscriber station from multiple synchronized base stations are orthogonal as long as the relative delays of the received signals are within the OFDM symbol cyclic prefix length. Therefore, there is no interference when the same broadcast content is transmitted system-wide, apart from the background noise. The average SINR in an OFDM-based broadcast is given as:

$$SINR_{broadcast} = \frac{KP}{N_0}, \quad \{\text{Eqn. 3}\}$$

where the value P is the received power from one base station at the subscriber station and the value K is the number of base stations from which broadcast content is received, assuming equal power is received from K base stations. It should be noted that increasing transmit power results in a linear increase of broadcast SINR.

However, conventional OFDM networks that time-multiplex broadcast and unicast traffic suffer wasted power during unicast traffic transmissions. The reason for this wasted power is that transmitting at a higher power does not help to improve SINR for unicast traffic during unicast traffic transmission periods, due to increased interference from neighboring cells. As a result, the same performance may be achieved by transmitting unicast traffic at reduced power. However, the additional available power cannot be used for broadcast traffic, because broadcast traffic transmissions occur in different time slots (i.e., TTIs) than unicast traffic transmissions. Since either broadcast traffic or unicast traffic, but not both, may be transmitted during a given TTI, it is not possible to allocate the available downlink power adaptively between unicast and broadcast traffic. This results in system inefficiency Therefore, there is a need for improved OFDM (or OFDMA) transmission systems that make better use of the available downlink transmit power.

SUMMARY OF THE INVENTION

In one embodiment of the present disclosure, a base station is provided for use in an orthogonal frequency division multiplexing (OFDM) wireless network capable of communicating with a plurality of subscriber stations in a coverage area of the OFDM wireless network. The base station is capable of transmitting a first OFDM symbol in a first time slot, wherein the first OFDM symbol comprises a first plurality of subcarriers used to transmit broadcast data directed to a plurality of subscriber stations and a second plurality of subcarriers used to transmit unicast data directed to at least one selected subscriber station.

In another embodiment, a method is provided for transmitting broadcast and unicast data to the subscriber stations. The method comprises the step of transmitting a first OFDM symbol in a first time slot, wherein the first OFDM symbol comprises a first plurality of subcarriers used to transmit broadcast data directed to a plurality of subscriber stations and a second plurality of subcarriers used to transmit unicast data directed to at least one selected subscriber station.

In another embodiment, a first subscriber station is provided for communicating with an orthogonal frequency division multiplexing (OFDM) wireless network. The first subscriber station is capable of receiving a first OFDM symbol in a first time slot, wherein the first OFDM symbol comprises a first plurality of subcarriers used to transmit broadcast data directed to the first subscriber station and a second subscriber station and a second plurality of subcarriers used to transmit first unicast data directed only to the first subscriber station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present disclosure is directed to a transmission technique in which broadcast traffic is frequency-multiplexed with the unicast traffic in the downlink. This provides simultaneous transmission of broadcast and unicast traffic and therefore allows for adaptive power allocation between broadcast traffic and unicast traffic. This results in higher spectral efficiency.

Figure 1:
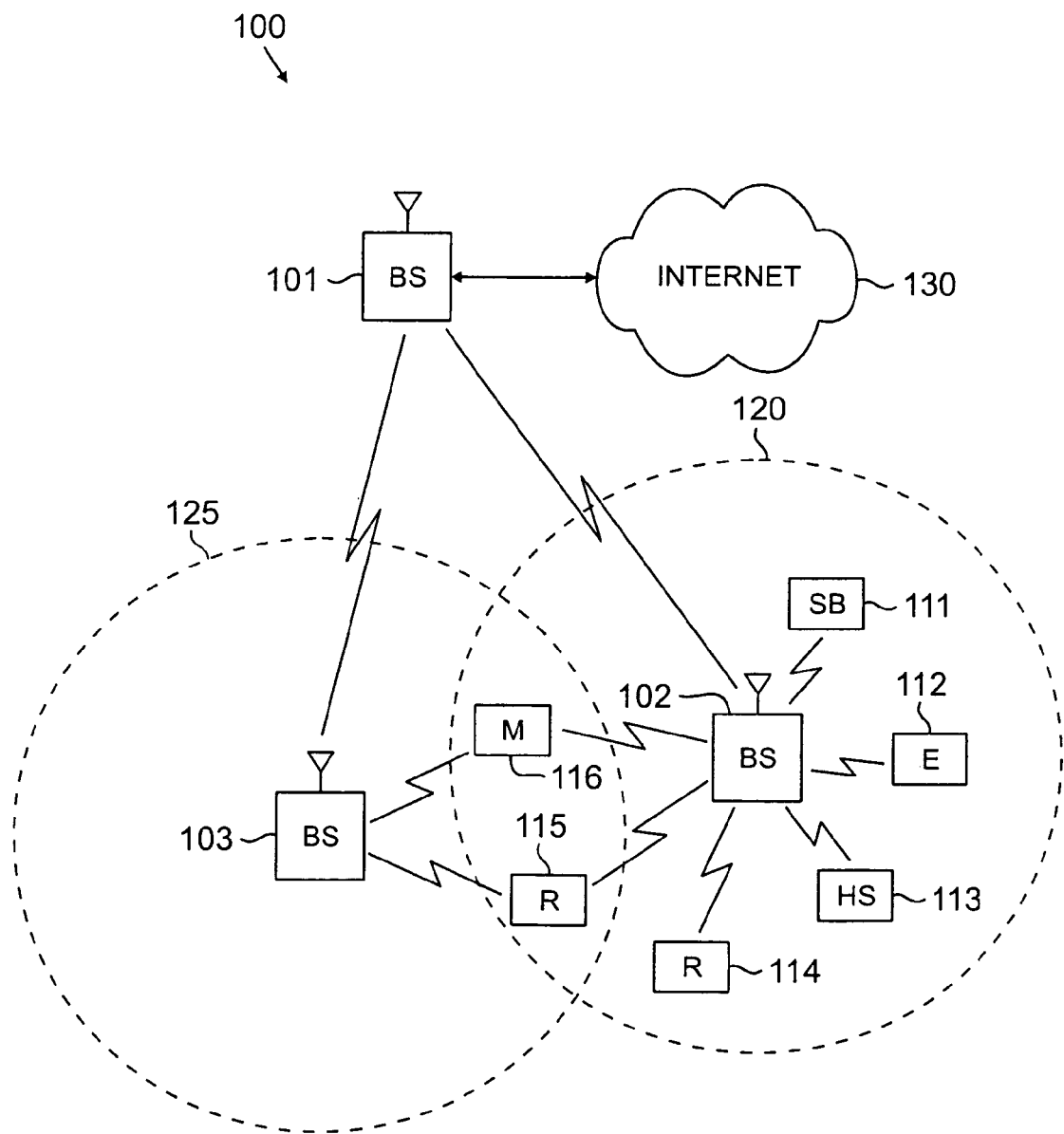
FIG. 1 illustrates an exemplary wireless network that allocates transmit power between broadcast traffic and unicast traffic according to the principles of the present disclosure.

FIG. 1 illustrates exemplary wireless network 100, which allocates transmit power in the downlink between broadcast traffic and unicast traffic according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
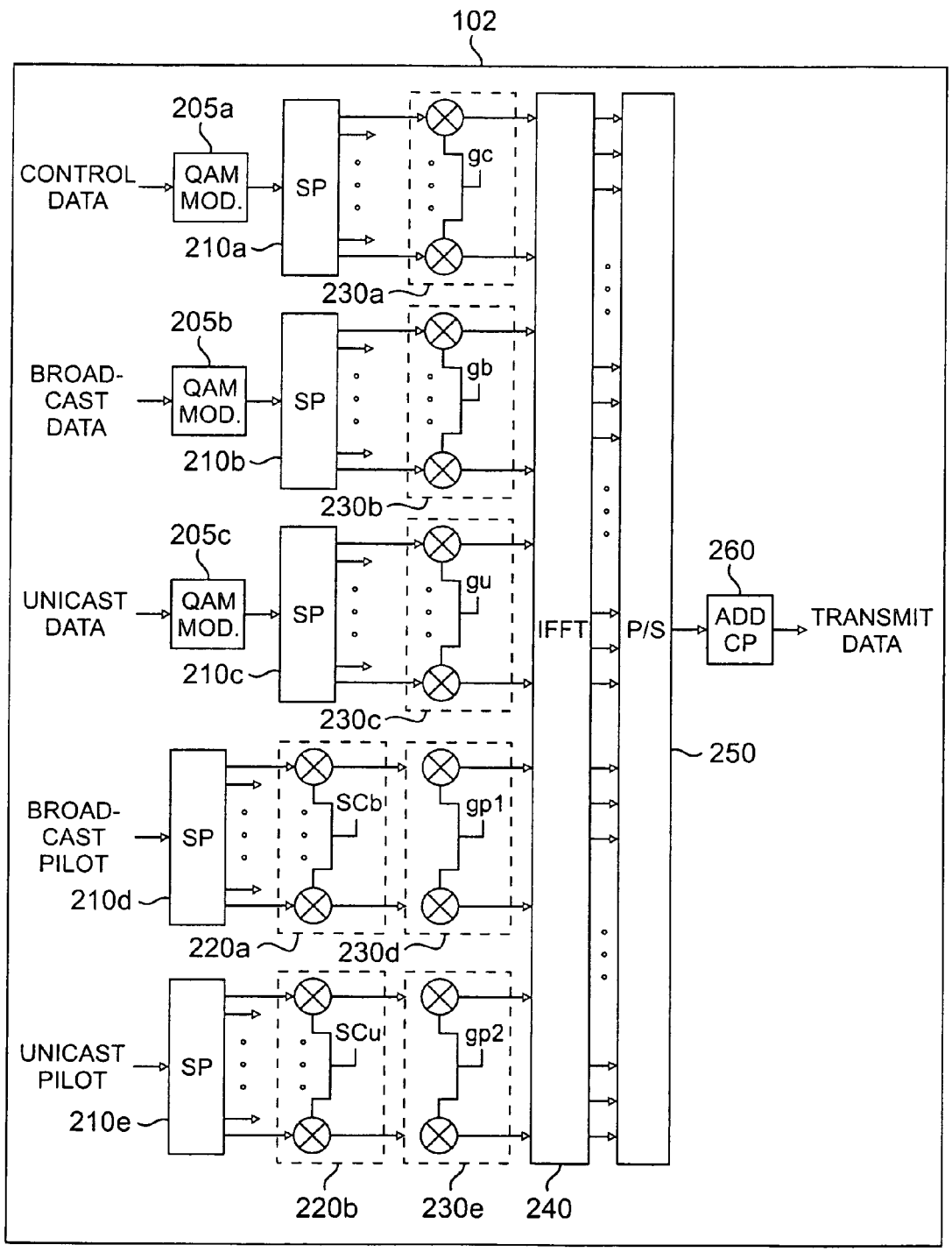
FIG. 2 is a high-level diagram of an OFDMA base station according to one embodiment of the present disclosure.

FIG. 2 is a high-level diagram of base station 102, which allocates transmit power in the downlink between broadcast traffic and unicast traffic according to the principles of the present disclosure. Base station 102 comprises a plurality of quadrature amplitude modulation (QAM) blocks 205, including exemplary QAM blocks 205a, 205b and 205c, and a plurality of serial-to-parallel (S/P) blocks 210, including exemplary S/P blocks 210a, 210b, 210c, 210d and 210e. Base station (BS) 102 further comprises scrambling code multiplier blocks 220a and 220b, a plurality of gain multiplier blocks 230, including exemplary gain multiplier blocks 230a, 230b, 230c, 230d and 230e, inverse Fast Fourier Transform (IFFT) block 240, parallel-to-serial (P/S) block 250, and add cyclic prefix (CP) block 260. At least some of the components in FIG. 2 may be implemented in software while other components may be implemented by configurable hardware or a mixture of software and configurable hardware. In particular, it is noted that the IFFT block in FIG. 2 may be implemented as configurable software algorithms, where the value of IFFT size may be modified according to the implementation.

Streams of broadcast data symbols, unicast data symbols, and control data symbols (e.g., pilot signal, ACK/NACK messages) are separately coded (not shown) using a channel code, such as Turbo code or low-density parity check (LDPC) code. The coded broadcast, unicast and control symbols are applied to the inputs of QAM blocks 210a-c. QAM block 210a modulates the control symbol stream to produce a first sequence of frequency-domain modulation symbols. QAM block 210b modulates the broadcast symbol stream to produce a second sequence of frequency-domain modulation symbols. The broadcast symbol stream comprises one stream of broadcast data directed to a plurality of subscriber stations. QAM block 210c modulates the unicast symbol stream to produce a third sequence of frequency-domain modulation symbols. The unicast symbol stream may comprise a single unicast data stream directed to a single subscriber station or may comprise a plurality of unicast data substreams, where each unicast substream is directed to a different subscriber station.

S/P block 210a converts (i.e., de-multiplexes) to parallel format the first sequence of serial QAM control symbols from QAM block 205a and selectively maps the parallel format QAM control symbols to selected OFDM subcarriers at the inputs of IFFT block 240. However, each of the QAM control symbols from S/P block 210a is first multiplied (i.e., scaled) by a control gain factor, gc, by one of the multipliers in gain multiplier block 230a. The amplitude-scaled QAM control symbols are then applied to the selected inputs of IFFT block 240.

Similarly, S/P block 210b converts (de-multiplexes) to parallel format the second sequence of serial QAM broadcast symbols from QAM block 205b and selectively maps the parallel format QAM broadcast symbols to selected OFDM subcarriers at the inputs of IFFT block 240. However, each of the QAM broadcast symbols from S/P block 210b is first multiplied (scaled) by a broadcast gain factor, gb, by one of the multipliers in gain multiplier block 230b. The amplitude-scaled QAM broadcast symbols are then applied to the selected inputs of IFFT block 240.

Likewise, S/P block 210c converts (de-multiplexes) to parallel format the third sequence of serial QAM unicast symbols from QAM block 205c and selectively maps the parallel format QAM unicast symbols to selected OFDM subcarriers at the inputs of IFFT block 240. However, each of the QAM unicast symbols from S/P block 210c is first multiplied (scaled) by a unicast gain factor, gu, by one of the multipliers in gain multiplier block 230c. The amplitude-scaled QAM unicast symbols are then applied to the selected inputs of IFFT block 240.

In order to provide coherent demodulation of broadcast and unicast traffic, reference pilot symbols may be transmitted from base station 101-103 to subscriber stations 111-116. For broadcast data, the same content is transmitted from multiple base stations, so that an overall channel estimate based on transmissions from multiple base stations is required for accurate demodulation of broadcast traffic. However, unicast traffic is transmitted from only a single base station, so that a channel estimate is needed from only a single base station to a subscriber station.

Thus, two different pilot signals are transmitted from a base station when broadcast and unicast traffic are frequency multiplexed. In order to differentiate these two pilot signals at the subscriber station, a broadcast scrambling code (SCb) scrambles the broadcast pilot signal and a unicast scrambling code (SCu) scrambles the unicast pilot signal. The unicast scrambling code, SCu, may be different from one base station to another.

S/P block 210d receives a known stream of broadcast pilot symbols and converts (de-multiplexes) the broadcast pilot symbols to parallel format. S/P block 210d selectively maps the broadcast pilot symbols to selected OFDM subcarriers at the inputs of IFFT block 240. However, each of the broadcast pilot symbols from S/P block 210d is first multiplied by a broadcast scrambling code, SCb, by one of the multipliers in scrambling code multiplier block 220a and is then multiplied (scaled) by a broadcast pilot gain factor, gp1, by one of the multipliers in gain multiplier block 230d. The scrambled and scaled broadcast pilot symbols are then applied to the selected inputs of IFFT block 240.

S/P block 210e receives a known stream of unicast pilot symbols and converts (de-multiplexes) the unicast pilot symbols to parallel format. S/P block 210e selectively maps the unicast pilot symbols to selected OFDM subcarriers at the inputs of IFFT block 240. However, each of the unicast pilot symbols from S/P block 210e is first multiplied by a unicast scrambling code, SCu, by one of the multipliers in scrambling code multiplier block 220b and is then multiplied (scaled) by a unicast pilot gain factor, gp2, by one of the multipliers in gain multiplier block 230e. The scrambled and scaled unicast pilot symbols are then applied to the selected inputs of IFFT block 240.

IFFT block 240 then performs a size N IFFT operation on the N inputs received from gain multiplier blocks 230a-e and produces N outputs. IFFT block 240 may receive M1 inputs of control data from gain multiplier block 230a, M2 inputs of broadcast data from gain multiplier block 230b, M3 inputs of unicast data from gain multiplier block 230c, M4 inputs of broadcast pilot signal from gain multiplier block 230d, and M5 inputs of unicast pilot signal from gain multiplier block 230b, where the sum M1+M2+M3+M4+M5 is less than or equal to the size N of IFFT block 240. In some embodiments, the unicast and broadcast pilot signals may be transmitted in different time slots than the unicast symbols, broadcast symbols, and control symbols. In that case, the sum M1+M2+M3 is less than or equal to the size N of IFFT block 240 during time slots in which the unicast symbols, broadcast symbols, and control symbols are transmitted and the sum M4+M5 is less than or equal to the size N of IFFT block 240 during time slots in which the unicast and broadcast pilot signals are transmitted.

Also, in some embodiments, all M3 inputs from gain multiplier block 230*c* may represent a single unicast data stream being transmitted to a single subscriber station during one time slot. Alternatively, the M3 inputs may be divided into two or more subgroups of subcarriers, where each subgroup of subcarriers represents a single unicast data stream being transmitted to a single subscriber station during one time slot.

The N outputs from IFFT block 240 are parallel-to-serial converted by P/S block 250 to produce a serial data stream of combined symbols. Finally, add cyclic prefix block 260 adds a cyclic prefix to the output of IFFT block 250 prior to up-conversion (not shown) and transmission.

According to the principles of the present disclosure, base station 102 is capable of modifying the values of the broadcast gain factor, gb, and the unicast gain factor, gu, in order to allocate transmit power in the downlink between broadcast traffic and unicast traffic. This provides a capability of sharing power between broadcast and unicast data.

Figure 3:
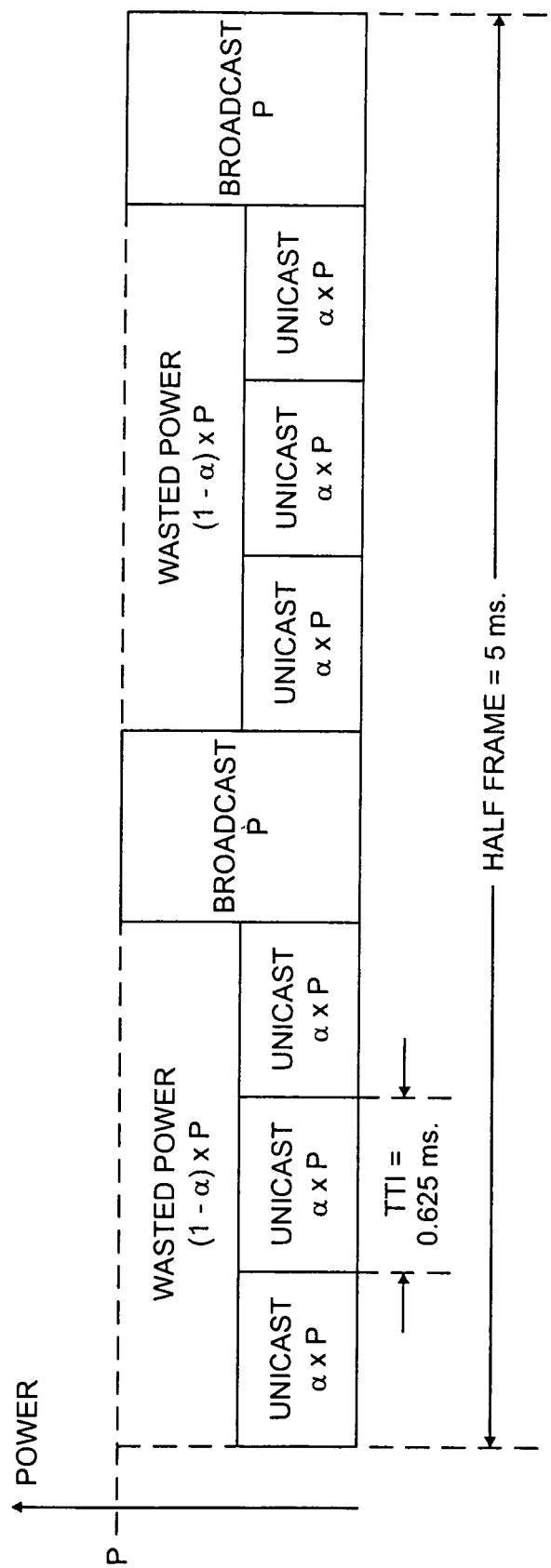
FIG. 3 illustrates the transmission of unicast traffic and broadcast traffic in a prior art time-multiplexed system.

FIG. 3 illustrates the transmission of unicast traffic and broadcast traffic in a time-multiplexed system according to the principles of the prior art. One half-frame of 5 milliseconds duration is illustrated. The half-frame comprises eight (8) transmission time intervals. Each transmission time interval (TTI) has a duration of 0.625 milliseconds. The fourth TTI and the eighth TTI contain broadcast data. The other six TTIs contain unicast data.

During the broadcast TTI slots, transmission occurs at the full power, P watts, because transmitting at a higher power always helps the broadcast traffic. The total energy transmitted for broadcast traffic for the time-multiplexed case is then P/4 Joules, assuming the $\frac{1}{4}^{th}$ duty cycle for broadcast traffic shown in FIG. 3. However, in the unicast TTI slots for the time-multiplexed case, a power of only αP watts is used for unicast traffic, so that (1−α)P watts of power is wasted because transmission at increased power does not help to improve unicast SINR.

Figure 4:
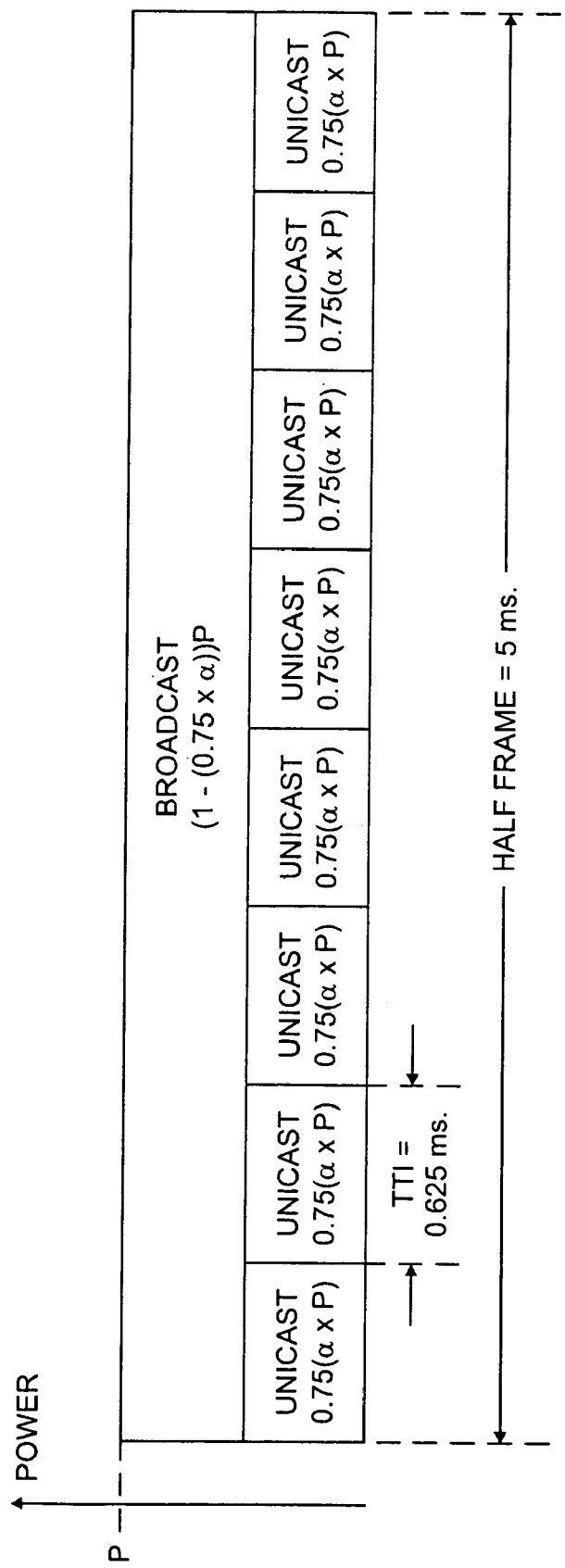
FIG. 4 illustrates the transmission of unicast traffic and broadcast traffic in a frequency-multiplexed system according to the principles of the present disclosure.

FIG. 4 illustrates the transmission of unicast traffic and broadcast traffic in a frequency-multiplexed system according to the principles of the present disclosure. Again, one half-frame of 5 milliseconds duration is illustrated. The half-frame comprises eight (8) transmission time intervals. Each transmission time interval (TTI) has a duration of 0.625 milliseconds. However, unlike the time-multiplexed case, all eight TTI slots contain both broadcast traffic and unicast traffic.

In the frequency-multiplexed case, the transmit power may be shared between the unicast and broadcast traffic. Therefore, when broadcast traffic is transmitted at the same time as the unicast traffic using orthogonal subcarriers, the unused unicast power may be allocated to transmit the broadcast traffic. Thus, the unused power that was not helping the unicast traffic in FIG. 3 may now be used to improve the broadcast performance. In the case of frequency-multiplexing, $\frac{1}{4}^{th}$ of the subcarrier resources are allocated to broadcast symbols in order to match the bandwidth fraction of the $\frac{1}{4}^{th}$ duty cycle for the time-multiplexing case. Thus, the performance of the unicast traffic is unaffected. However, the energy for broadcast traffic is now (2−α)P/4 Joules. Since α has a value between 0 and 1, the broadcast energy in the frequency multiplexed case is greater than the P/4 Joules in the time-multiplexed case in FIG. 3. The broadcast gain factor, gb, and the unicast gain factor, gu, control the value of α.

Figure 5A:
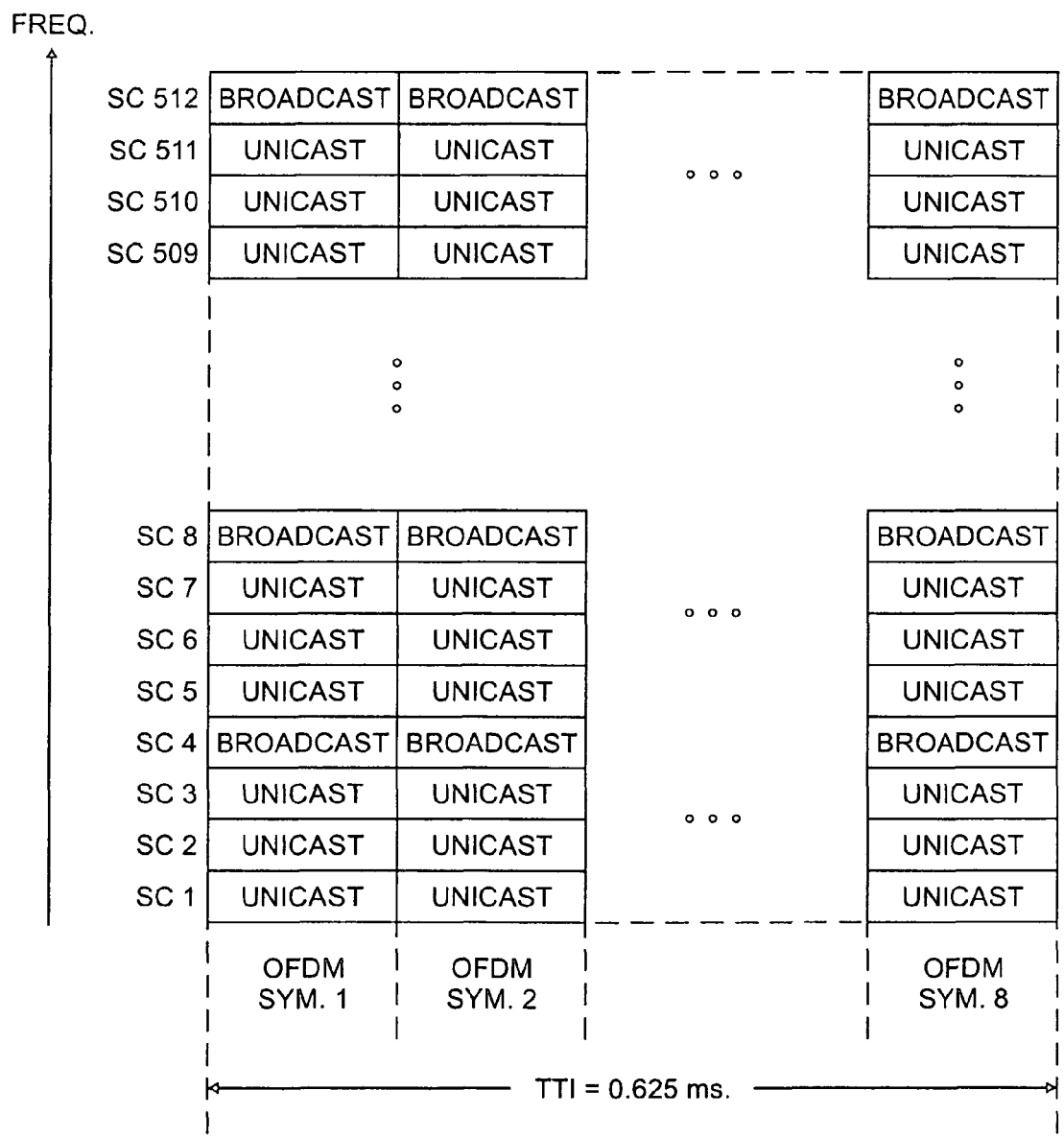
FIG. 5 illustrates the mapping of broadcast and unicast traffic to OFDM subcarriers in a transmission time interval (TTI) according to one embodiment of the present disclosure.

FIG. 5A illustrates the mapping of broadcast traffic and unicast traffic to orthogonal subcarriers within a transmission time interval (TTI) according to an exemplary embodiment of the present disclosure. Eight OFDM symbols are transmitted within the TTI. Each OFDM symbol comprises 512 subcarriers, labeled SC 1 through SC 512. In the illustrated embodiment, every fourth subcarrier (SC) is used for broadcast data. For example SC 4, SC 8, SC 12, . . . , SC 512 may be used to carry broadcast traffic. The broadcast symbols are scattered in frequency and time to provide time and frequency diversity for the broadcast traffic. It is noted that frequency-multiplexing of broadcast traffic allows for continuous transmission of the broadcast traffic, thus providing greater time-diversity gains relative to the case of time-multiplexing of broadcast and unicast traffic.

Figure 5B:
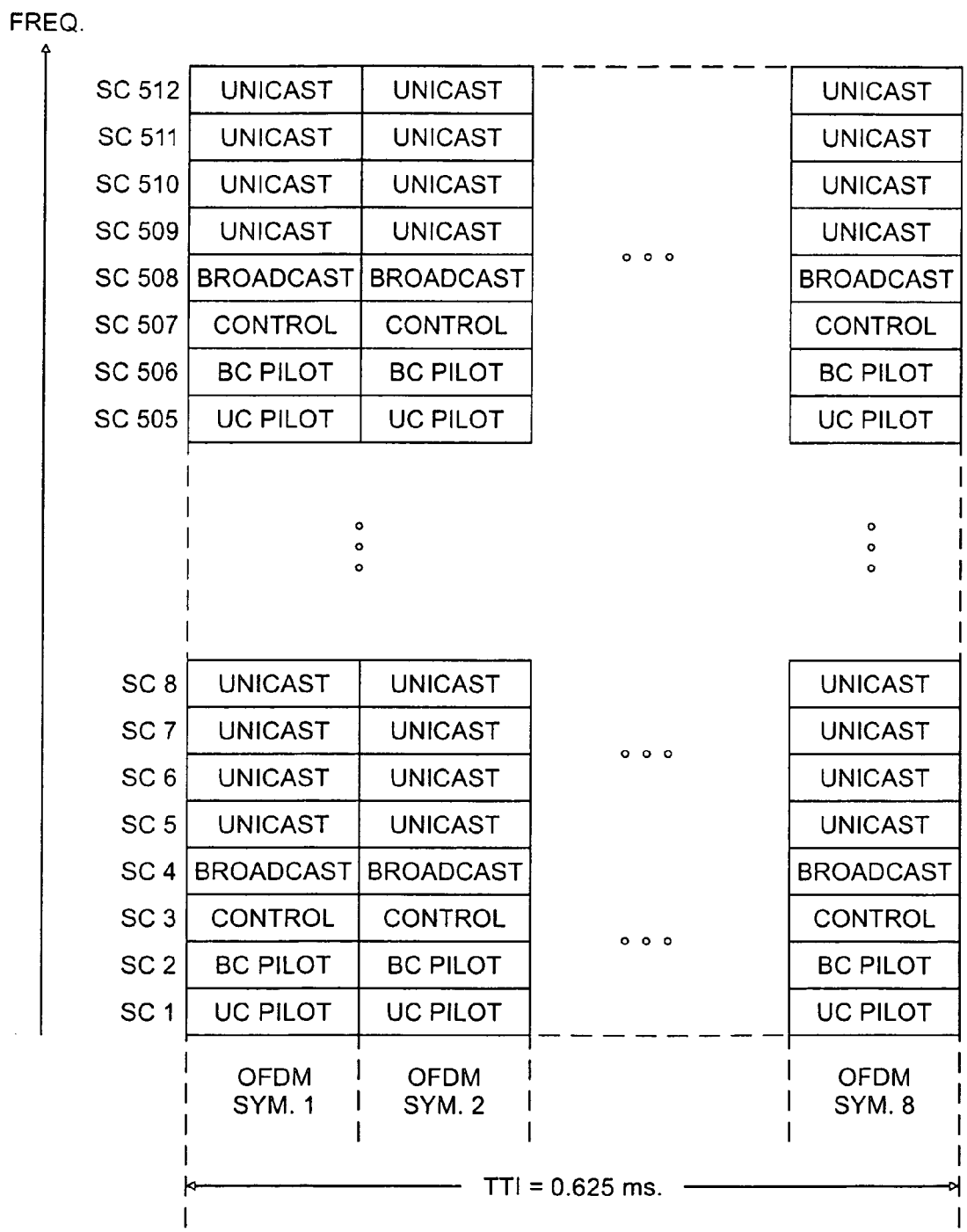

For purposes of simplicity and clarity, FIG. 5A illustrates only the mapping of broadcast and unicast traffic. However, as FIG. 2 indicates, in practical environments, other types of signals must also be mapped to subcarriers. FIG. 5B illustrates the mapping of broadcast traffic, unicast traffic, control signals, broadcast (BC) pilot signals, and unicast (UC) pilot signals to orthogonal subcarriers within a transmission time interval (TTI) according to another embodiment of the present disclosure. Depending on the implementation and on user demand, some transmission time intervals may contain only broadcast and unicast traffic, as in FIG. 5A, while other transmission time intervals may contain broadcast and unicast traffic, as well as one or more of control signals, broadcast pilot signals, and unicast pilot signals, as in FIG. 5B.

In FIG. 5B, eight OFDM symbols are transmitted within the TTI. Each OFDM symbol comprises 512 subcarriers, labeled SC 1 through SC 512. In the illustrated embodiment, the first four subcarriers are used for: a unicast pilot signal (SC 1), a broadcast pilot signal (SC 2), a control signal (SC 3), and broadcast traffic data (SC 4). The next four subcarriers are used for unicast data (i.e., SC 5-SC 8). This pattern repeats every eight subcarriers from SC 1 through SC 512. Thus, the broadcast and unicast data symbols, the control symbols, and the broadcast and unicast pilot symbols are scattered in frequency and time to provide time and frequency diversity.

Figure 6:
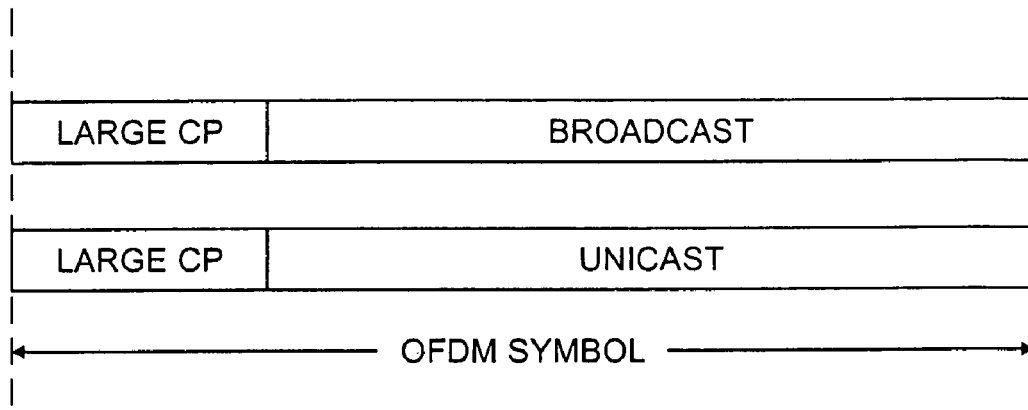
FIG. 6 illustrates cyclic prefixes in OFDM symbols for broadcast and unicast traffic according to one embodiment of the present disclosure.

FIG. 6 illustrates cyclic prefixes in exemplary OFDM symbols for broadcast and unicast traffic according to one embodiment of the disclosure. In general, a longer cyclic prefix (CP) is used for broadcast traffic because broadcast traffic is transmitted simultaneously from multiple base stations. A subscriber station receiving broadcast traffic may be far away from some base stations. Therefore, the propagation delays between the distant base stations and the subscriber station are large. The larger CP for broadcast traffic allows signals from multiple base stations to be more easily captured at the receiving subscriber station.

Normally, a subscriber station receives unicast traffic from only one base station (i.e., the BS for the cell in which it is located). The propagation delays are therefore small and a relatively smaller CP length may be sufficient. However, since broadcast and unicast traffic are frequency-multiplexed using OFDMA, the cyclic prefixes for both traffic types have the same length. Thus, when unicast traffic uses the same CP length as broadcast traffic in a frequency-multiplexing system, there is some waste of resources in the case of unicast traffic (i.e., excessively long cyclic prefixes).

Figure 7:
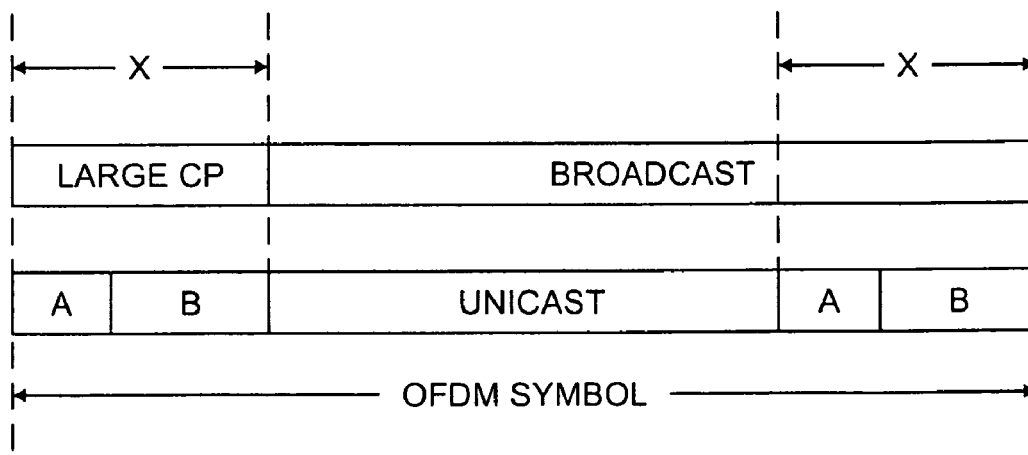
FIG. 7 illustrates soft-combining of cyclic prefixes for unicast traffic according to one embodiment of the present disclosure.

Some or all of this loss may be recovered by providing soft-combining of cyclic prefixes for the unicast traffic as shown in FIG. 7. As is well known, a cyclic prefix (CP) is generated by copying the last X samples of a block of data and appending the copied X samples to the start of the block of data, so that the first X samples and the last X samples of the total data package (i.e., data symbol) are the same. The CP used by the unicast traffic and broadcast traffic may be regarded as comprising two parts: Part A and Part B. In the example in FIG. 7, the last X samples (i.e., Parts A and B) of the broadcast data) are appended to the start of the broadcast data to form a relatively large CP. Likewise, the last X samples of the unicast data, which are explicitly shown as Part A and Part B, are similarly appended to the start of the unicast data.

Decoding the broadcast traffic uses the full CP length (i.e., both Part A and Part B). However, decoding the unicast traffic requires only part A of the CP because signal propagation delays are relatively short within the same cell site. Since Part B of the CP is not needed, the receivers in subscriber stations 111-116 combine Part B of the CP with Part B at the end of the unicast OFDM symbol. This makes the samples in Part B more reliable for unicast traffic, thereby improving the resulting signal-to-interference and noise ratio (SINR) on OFDM subcarriers after the FFT operation is performed at the receiver.

Figure 8:
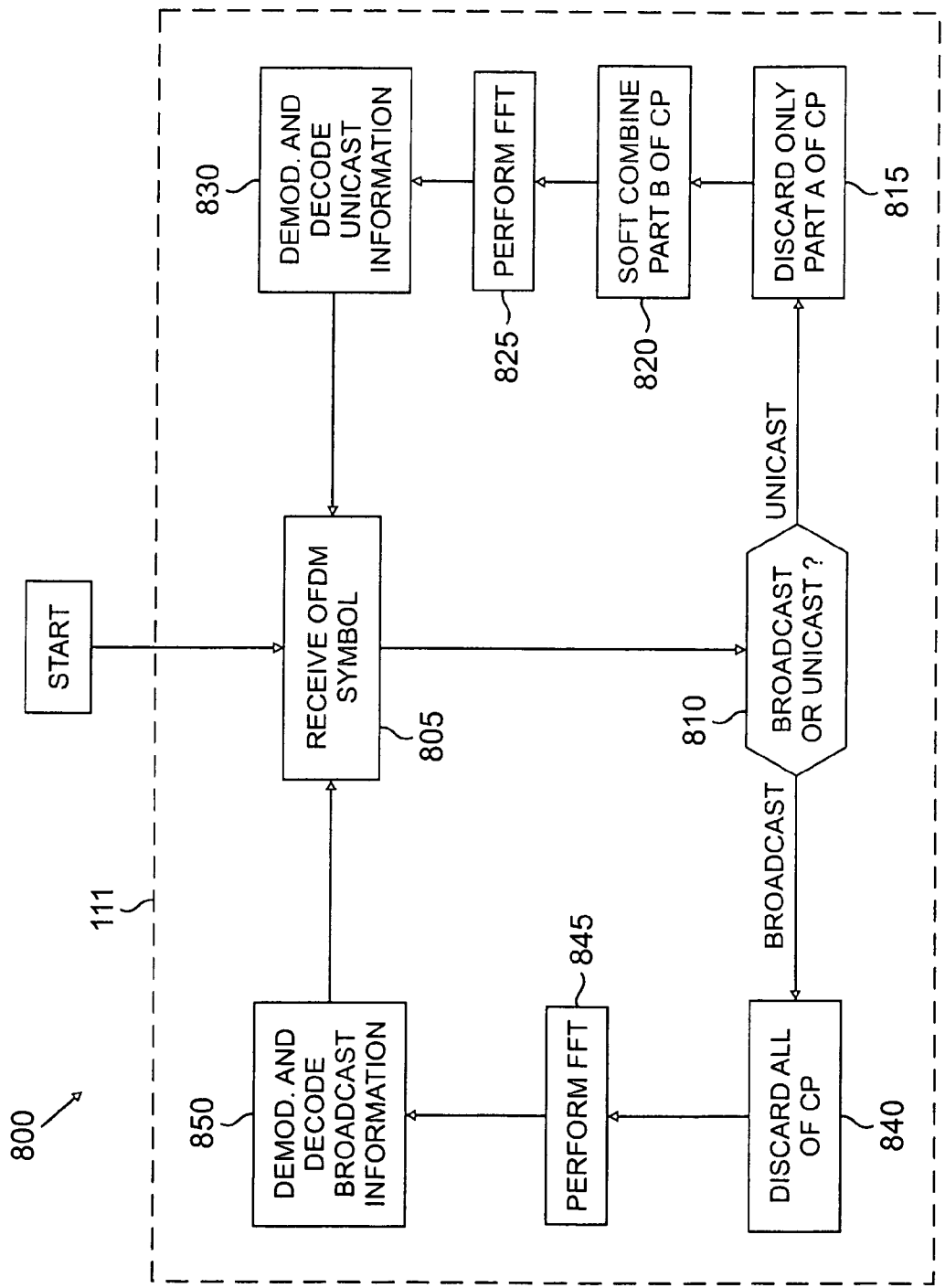
FIG. 8 is a flow diagram illustrating the soft-combining of cyclic prefixes according to one embodiment of the present disclosure.

FIG. 8 depicts flow diagram 800, which illustrates the soft-combining of cyclic prefixes in subscriber station 111 according to one embodiment of the present disclosure. Initially, subscriber station (SS) 111 receives an OFDM symbol (process step 805). Next, SS 111 determines whether the OFDM symbol is a broadcast symbol or a unicast symbol according to the time and frequency slot (process step 810). If the received OFDM symbol is a broadcast symbol, SS 111 discards the entire CP (process step 840). SS 111 then performs an FFT operation on the remaining data (process step 845) and demodulates and decodes the broadcast information (process step 850).

If the received OFDM symbol is a unicast symbol, SS 111 discards only Part A of the CP (process step 815). Part A of the CP accounts for propagation delay and multipath delay within cell 120 in which SS 111 is located. SS 111 soft-combines Part B of the CP with the corresponding sample positions from the end of the unicast data block (process step 820). SS 111 then performs an FFT operation on the remaining data (process step 825) and demodulates and decodes the broadcast information (process step 830).

In broadcast transmission over a cellular system, the same information content is transmitted simultaneously from all the cells in the system or from a subset of the cells. In the case of broadcast transmission from a subset of the cells, the cells transmitting the same content belong to a broadcast zone. A subscriber station receiving the broadcast content may receive signals from all the cells in the broadcast zone. If all the cells in the broadcast zone are synchronized and OFDM is used for transmission of the broadcast data, then signal strength from all the cells can be collected without interference, apart from the background noise and interference from cells not belonging to the broadcast zone. Therefore, signal-to-interference-plus-noise ratio (SINR) of the received broadcast signal can be improved.

Subscriber stations located near the middle of the broadcast zone may receive broadcast signals from all neighboring cells, thereby increasing SINR and reception quality. However, subscriber stations at the edge of the broadcast zone may only receive broadcast signals from a few cells. Therefore, the broadcast SINR and reception quality for subscriber stations at the edge of the broadcast zone are poor relative to subscriber stations in the middle of the broadcast zone. This problem may be reduced if broadcast and unicast traffic are frequency-multiplexed. Cells at the edge of a broadcast zone simply transmit broadcast content at higher power relative to cells in the center of the broadcast zone. This improves SINR for subscriber stations at the edge of the broadcast zone.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in an orthogonal frequency division multiplexing (OFDM) wireless network capable of communicating with a plurality of subscriber stations in a coverage area of the OFDM wireless network, a base station capable of transmitting a first OFDM symbol in a first time slot, wherein the first OFDM symbol comprises
   a first plurality of subcarriers used to transmit broadcast data directed to a first plurality of subscriber stations and
   a second plurality of subcarriers used to transmit unicast data directed to at least one selected subscriber station simultaneously with the transmission of the broadcast data by the first plurality of subcarriers.

2. The base station as set forth in claim 1, wherein the first plurality of subcarriers are distributed across a frequency spectrum allocated to the first OFDM symbol.

3. The base station as set forth in claim 1, wherein the base station is capable of adjusting a broadcast gain factor, gb, used to control the transmit power of the first plurality of subcarriers.

4. The base station as set forth in claim 3, wherein the base station is capable of adjusting a unicast gain factor, gu, used to control the transmit power of the second plurality of subcarriers.

5. The base station as set forth in claim 4, wherein the first OFDM symbol further comprises a third plurality of subcarriers used to transmit a broadcast pilot signal directed to the first plurality of subscriber stations and a fourth plurality of subcarriers used to transmit a unicast pilot signal directed to the at least one selected subscriber station.

6. The base station as set forth in claim 5, wherein the base station is capable of adjusting a broadcast pilot gain factor, gp1, used to control the transmit power of the third plurality of subcarriers.

7. The base station as set forth in claim 6, wherein the base station is capable of adjusting a unicast pilot gain factor, gp2, used to control the transmit power of the fourth plurality of subcarriers.

8. An orthogonal frequency division multiplexing (OFDM) wireless network comprising a plurality of base stations capable of communicating with a plurality of subscriber stations in a coverage area of the OFDM network, wherein each of the plurality of base stations is capable of transmitting a first OFDM symbol in a first time slot, wherein the first OFDM symbol comprises a first plurality of subcarriers used to transmit broadcast data directed to a first plurality of subscriber stations and a second plurality of subcarriers used to transmit unicast data directed to at least one selected subscriber station simultaneously with the transmission of the broadcast data by the first plurality of subcarriers.

9. The OFDM wireless network as set forth in claim 8, wherein the first plurality of subcarriers are distributed across a frequency spectrum allocated to the first OFDM symbol.

10. The OFDM wireless network as set forth in claim 8, wherein the base station is capable of adjusting a broadcast gain factor, gb, used to control the transmit power of the first plurality of subcarriers.

11. The OFDM wireless network as set forth in claim 10, wherein the base station is capable of adjusting a unicast gain factor, gu, used to control the transmit power of the second plurality of subcarriers.

12. The OFDM wireless network as set forth in claim 11, wherein the first OFDM symbol further comprises a third plurality of subcarriers used to transmit a broadcast pilot signal directed to the first plurality of subscriber stations and a fourth plurality of subcarriers used to transmit a unicast pilot signal directed to the at least one selected subscriber station.

13. The OFDM wireless network as set forth in claim 12, wherein the base station is capable of adjusting a broadcast pilot gain factor, gp1, used to control the transmit power of the third plurality of subcarriers.

14. The OFDM wireless network as set forth in claim 13, wherein the base station is capable of adjusting a unicast pilot gain factor, gp2, used to control the transmit power of the fourth plurality of subcarriers.

15. For use in an orthogonal frequency division multiplexing (OFDM) network capable of communicating with a plurality of subscriber stations in a coverage area of the OFDM network, a method of transmitting broadcast and unicast data to the subscriber stations, the method comprising the step of
transmitting a first OFDM symbol in a first time slot, wherein the first OFDM symbol comprises a first plurality of subcarriers used to transmit broadcast data directed to a first plurality of subscriber stations and a second plurality of subcarriers used to transmit unicast data directed to at least one selected subscriber station simultaneously with the transmission of the broadcast data by the first plurality of subcarriers.

16. The method as set forth in claim 15, wherein the first plurality of subcarriers are distributed across a frequency spectrum allocated to the first OFDM symbol.

17. The method as set forth in claim 15, further comprising the step of adjusting a broadcast gain factor, gb, used to control the transmit power of the first plurality of subcarriers.

18. The method as set forth in claim 17, further comprising the step of adjusting a unicast gain factor, gu, used to control the transmit power of the second plurality of subcarriers.

19. The method as set forth in claim 18, wherein the first OFDM symbol further comprises a third plurality of subcarriers used to transmit a broadcast pilot signal directed to the first plurality of subscriber stations and a fourth plurality of subcarriers used to transmit a unicast pilot signal directed to the at least one selected subscriber station.

20. The method as set forth in claim 19, further comprising the step of adjusting a broadcast pilot gain factor, gp1, used to control the transmit power of the third plurality of subcarriers.

21. The method as set forth in claim 20, further comprising the step of adjusting a unicast pilot gain factor, gp2, used to control the transmit power of the fourth plurality of subcarriers.

22. A first subscriber station capable of communicating with an orthogonal frequency division multiplexing (OFDM) wireless network, wherein the first subscriber station is capable of receiving a first OFDM symbol in a first time slot, wherein the first OFDM symbol comprises a first plurality of subcarriers used to transmit broadcast data directed to the first subscriber station and a second subscriber station and a second plurality of subcarriers used to transmit first unicast data directed only to the first subscriber station simultaneously with the transmission of the broadcast data by the first plurality of subcarriers.

23. The first subscriber station as set forth in claim 22, wherein the first plurality of subcarriers are distributed across a frequency spectrum allocated to the first OFDM symbol.

24. The first subscriber station as set forth in claim 22, wherein the first OFDM symbol further comprises a third plurality of subcarriers used to transmit a broadcast pilot signal directed to the first subscriber station and the second subscriber station and a fourth plurality of subcarriers used to transmit a unicast pilot signal directed to the first subscriber station.

* * * * *